United States Patent
Beltrami et al.

(10) Patent No.: US 6,627,836 B2
(45) Date of Patent: Sep. 30, 2003

(54) ELECTRICAL DISCHARGE PROCESS AND A DEVICE FOR MULTIPLE WIRE PROCESSING

(75) Inventors: Ivano Beltrami, Cavigliano (CH); Wolfgang Nagel, Verscio (CH); Josef Budin, Minusio (CH)

(73) Assignee: Agie SA, Losone (CH)

( * ) Notice: Subject to any disclaimer, the term of this patent is extended or adjusted under 35 U.S.C. 154(b) by 0 days.

(21) Appl. No.: 10/229,425

(22) Filed: Aug. 28, 2002

(65) Prior Publication Data

US 2003/0052092 A1 Mar. 20, 2003

(30) Foreign Application Priority Data

Sep. 11, 2001 (EP) .............................. 01121855

(51) Int. Cl.[7] ................................. B23H 7/06
(52) U.S. Cl. ................................. 219/69.12
(58) Field of Search ........................ 219/69.12, 69.17

(56) References Cited

U.S. PATENT DOCUMENTS

| | | | |
|---|---|---|---|
| 5,237,145 A | 8/1993 | Magara et al. | 219/69.12 |
| 5,438,178 A | 8/1995 | Bühler et al. | 219/69.12 |
| 5,451,737 A | 9/1995 | Bertholds et al. | 219/69.12 |
| 5,922,220 A | 7/1999 | Beltrami et al. | 219/69.12 |

FOREIGN PATENT DOCUMENTS

| | | | | |
|---|---|---|---|---|
| EP | 0 578 018 B1 | | 1/1994 | |
| EP | 920945 A2 | * | 6/1999 | |
| JP | 56069037 A | | 6/1981 | |
| JP | 61-182729 A | * | 8/1986 | 219/69.12 |
| JP | 61-219528 | | 9/1986 | |
| JP | 63099134 A | | 4/1988 | |
| JP | 6-15529 A | * | 1/1994 | 219/69.12 |
| JP | 6-320340 A | * | 11/1994 | 219/69.12 |

OTHER PUBLICATIONS

*International Search Report*, corresponding to European patent application Ser. No. 01 121 855.9, European Patent Office, dated Mar. 12, 2002, 3 pages.

* cited by examiner

*Primary Examiner*—Geoffrey S. Evans
(74) *Attorney, Agent, or Firm*—Marshall, Gerstein & Borun

(57) ABSTRACT

Methods and apparatus are disclosed for the processing of a work piece by electrical discharge, the processing being carried out with at least two wire electrodes. In the process, the offset of both the positions of the at least two wire electrodes relative to one another are determined, which positions the wire electrodes occupy upon their clamping, because of their angles of contact on a corresponding wire guide and their different wire characteristics at the level of the work piece. Further, the positions for the wire electrodes during the processing of the work piece after a change from one wire electrode to the next one are connected on the basis of the offset determined between these wire electrodes.

17 Claims, 3 Drawing Sheets

| AGIEVISION - LISTING OF WIRES | | | | | | | | |
|---|---|---|---|---|---|---|---|---|
| Wire | Manufacturer designation | Diameter [mm] | Composition Core / casing | Modulus of elasticity x 10⁵ [N/mm²] | Residual length [m] | Reference force [N] | Reference position [mm] | Cent red with [-] |
| 01 | BERCO CUT 0.15 | 0.15 | | 1.04 | 0 | | --- | --- |
| 02 | BERCO CUT 0.20 | 0.20 | | 1.03 | 0 | | --- | --- |
| 03 | BERCO CUT 0.25 | 0.25 | | 1.06 | 0 | | --- | --- |
| 04 | BERCO CUT 0.30 | 0.30 | | 1.05 | 0 | | --- | --- |
| 05 | BERCO CUT A 0.10 | 0.10 | CuZn37 / Zn | 0.90 | 47053 / 59 K | 4.5 | 53.977 | [05-06-09] |
| 06 | BERCO CUT A 0.15 | 0.15 | CuZn37 / Zn | 1.04 | 51997 / 52 K | 10.0 | 53.974 | [05-06-09] |
| 07 | BERCO CUT A 0.20 | 0.20 | CuZn37 / Zn | 1.03 | 1965 / 29 K | 15.0 | --- | --- |
| 08 | BERCO CUT A 0.25 | 0.25 | | 1.03 | 0 | | --- | --- |
| 09 | BERCO CUT A 0.30 | 0.30 | CuZn37 / Zn | 1.03 | 19268 / 36 K | 20.0 | 53.968 | [05-06-09] |
| 10 | BERCO CUT D 0.25 | 0.25 | | 0.98 | 0 | | --- | --- |
| 11 | BERCO CUT S 0.30 | 0.30 | | 0.97 | 0 | | --- | --- |
| 12 | BERCO CUT S 0.33 | 0.33 | | 0.97 | 0 | | --- | --- |
| 13 | SP WIRE-30S | 0.03 | | 1.63 | 0 | | --- | --- |
| 14 | SP WIRE-50S | 0.05 | | 1.61 | 0 | | --- | --- |
| 15 | SP WIRE-70S | 0.07 | | 1.60 | 0 | | --- | --- |

FIG. 3

ELECTRICAL DISCHARGE PROCESS AND A DEVICE FOR MULTIPLE WIRE PROCESSING

FIELD OF THE DISCLOSURE

This disclosure relates to a process for the processing of a work piece by means of electrical discharge, whereby the processing is carried out with at least two wire electrodes (so-called "multiple wire processing"), and corresponding wire erosion machines.

BACKGROUND

In electrical discharge wire cutting machines, the form of the work piece to be manufactured is produced through the fact that the wire electrode and the work piece are moved against one another in such a manner that the desired contour (determined in the numeric control (NC) program) is brought about. The wire electrode is an endless wire which is continuously guided past the work point, and is thereby renewed continuously. For the specific processing goals that are to be achieved (precision, surface characteristics of the cutting surface, etc.), the processing is highly dependent upon the wire electrode that is used. Thus, it is often suitable to use different wire electrodes during a more complex processing. Different processing processes can be optimized in regard to the erosion process through the specific selection of different electrode types, or else different geometries can be simply cut. On conventional wire eroding machines, it is possible to carry out different work steps with different wire electrodes. For this, however, the operator must replace the wire supply spool manually and call up the program with suitable technology parameters. Processing with several types of wire has, therefore, previously been an exception. The specific processing task was, in general, carried out with one single wire. Wire eroding machines with an automatic wire changing device, such as disclosed in the Japanese patent disclosure document JP 56-069037, for example, have already been known for a number of years, however. One evident advantage of such a wire eroding machine lies in its increased autonomy. Thus, different types of wire can be used for the processing of the work piece within the framework of an unintended processing. Through the automatic changing of the wire, the processing time, and also the manufacturing costs as well, are thereby reduced.

There are various reasons that can lead to the choice of one of the types of wire, but the most important criterion for the decision is the smallest internal radius (rImin.) of the contour to be cut. This results from the sum of half the diameter of the wire and the width of the spark gap, as follows:

$$r_{1min} = \frac{d}{2} + s_{gap} \tag{1}$$

It follows from this, on the other hand, that the wire diameter, with the smallest internal radius determined, must be selected as follows:

$$d = 2 \cdot (r_{1min} - s_{gap}) \tag{2}$$

The use of an automatic wire changing device and of various wire electrodes within the framework of combined processing poses new problems, however, particularly in regard to the effect on the contour to be cut. In this connection, U.S. Pat. No. 5,237,145 describes a wire eroding process in which a first wire electrode from a multiplicity of wire electrodes standing ready on a wire supply roller is selected. The wire electrode thus selected is wound up. The electrical discharge processing is started. The first wire electrode is replaced by a second wire electrode with a different diameter, and an adjustment of the contour to be cut and of the width of the spark gap is carried out for the second wire electrode. The adjustment of the contour is an offset correction, carried out transversely to the specific cutting direction, that is determined by the different wire diameters. The entire contour is also "reduced" or "enlarged" correspondingly. No more comprehensive corrections are known from this publication, however.

BRIEF DESCRIPTION OF THE DRAWINGS

FIG. 1-b depicts a cross-section of the wire guiding head depicted in FIG. 1-a and, specifically so, the wire guide.

FIG. 3 illustrates a table in which, by way of example, specific electrode parameters and one possible offset to a combined wire electrode are listed for different wire electrodes.

DETAILED DESCRIPTION OF PREFERRED EXAMPLES

Figure 1A:
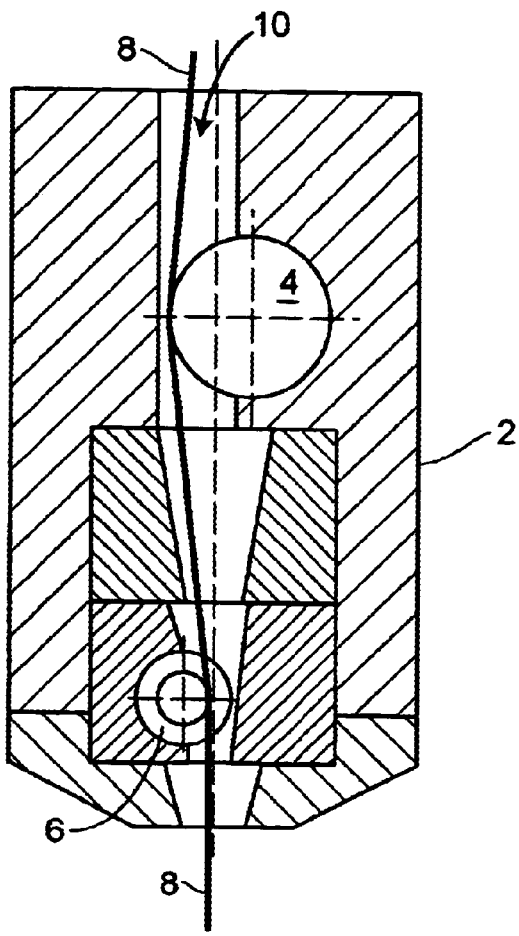
FIG. 1 depicts a partial schematic view of an upper wire guiding head, in which the course of a clamped wire electrode is evident.
Figure 1B:
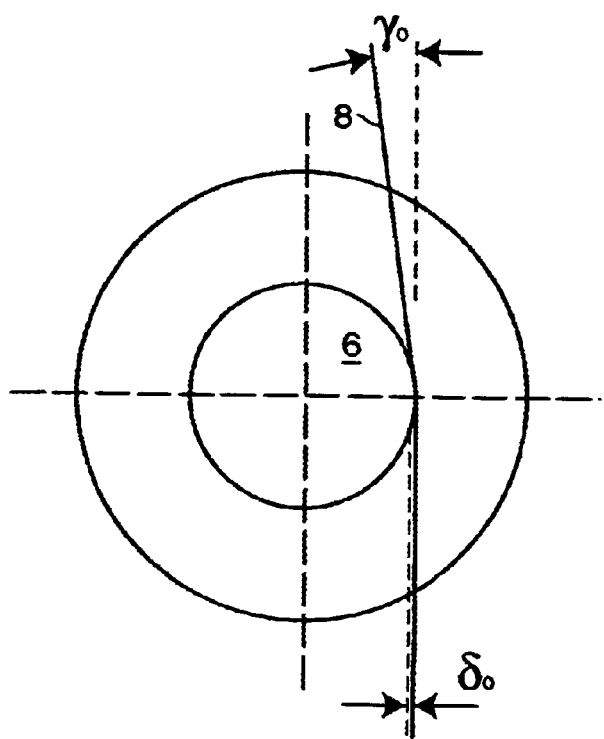

FIG. 1-a schematically depicts an upper wire guiding head (2), which supports a current guiding means (4) and as a wire guide (6). The wire guide (6) can be an open wire guide, such as a V-guide, for example. In the clamped condition, a wire electrode (8) proceeds through a channel (10) inside the wire guiding head (2). In order for the wire electrode (8), particularly in an open wire guide (V-shaped), to thereby be able to be applied securely to this and to be guided to it with firm contact, the processing electrode (8) must be conveyed, at a specific minimal angle of contact ($\gamma_0$) in relation to the vertical, to the wire guide (6). The angle of contact ($\gamma_0$) is depicted in FIG. 1-b. This is the angle between the vertical directed to the contact surface of the wire guide and the course of the wire of the wire electrode (8) above the wire guide (6). In actual practice, this minimal angle of contact ($\gamma_0$) is adjusted through the fact that the contact surface of the current guiding means (4) positioned upstream in the wire feeding device is offset slightly to the contact surface of the wire guide (6) (see FIG. 1-a). This angle of contact ($\gamma_0$) is accordingly a fixed angle which results from the positioning of the current guiding means (4) and the wire guide (6) in the wire guiding head (2).

Because of the different angle of contact ($\gamma_0$), wire diameter, moduli of elasticity, and other characteristics of the wire electrode (8), as well as the different wire traction forces on the clamped wire electrode (8), slight differences in the curvatures of the wire electrode (8) result immediately after their point of detachment from the wire guide (6), which is expressed in one specific displacement ($\delta_o$) from the vertical, depicted in FIG. 1-b, which is applied at this detachment point. In other words, the curvature of the wire electrode is somewhat less than the curvature of the wire guide (6) whereby, in actual practice, the complete displacement ($\delta_o$) is already achieved a few millimeters after leaving the wire guide (6). Consequently, this displacement ($\delta_o$) is constant over the entire height of the work piece.

In multiple wire processing, the different displacements ($\delta_o$) lead to different positions of the clamped wire electrodes (8) at the level of the work piece with an identical position of the wire guiding head (2). If this difference is not taken into consideration upon a change of the wire electrode (8), then an imprecision of the processing, is brought about. Instead of the open wire guide (6) described, any other form of guiding in which an angle of contact ($\gamma_0$) in relation to a wire guide leads to different displacements ($\delta_o$) with different wire electrodes (8) is also possible.

For this purpose, the different positions of the different wire electrodes (8) used in the multiple wire processing are determined, in sequence one after the other, at the height of the work piece, or at least somewhere between the upper and the lower guide (6) or the different displacements ($\delta_o$).

The displacement ($\delta_o$) can be computed in accordance with the following formula:

$$\delta_o = \frac{\gamma_o}{2} \sqrt{\frac{E \cdot I}{F}} \quad \text{in which:} \quad I = \frac{d^4 \cdot \pi}{64}$$

—whereby, in the formula, ($\gamma_0$) is the angle of contact of the wire electrode (8) in the wire guide (6), (E) is the modulus of elasticity, (I) is the axial surface moment of the second level derived from the diameter of the wire, and (d) is the diameter of the wire.

The offset of the positions of the middle points of the wire can be computed at the level of the work piece, from the individually computed displacements ($\delta_o$), through the fact that a wire electrode (8) (usually the wire electrode with which the multiple wire processing is started) is used as the reference electrode, and the difference of the displacements ($\delta_o$) of the remaining wire electrodes (8) computed in relation to the displacement of this wire electrode (8) is determined (or else the differences of the computed displacements ($\delta_o$) of the wire electrode (8) following one another in the processing). Upon the subsequent multiple wire processing of the work piece, the offset for the new wire electrode (8) is referred to, after a change of the wire electrode, and the path of the new wire electrode (8) is thereby corrected. The computational determination of and compensation for the distance between the middle points of the wires leads to a marked improvement of the precision of manufacturing in multiple wire processing.

It has turned out, in addition, that different wire electrodes have different characteristics, which lead to different displacements ($\delta_o$). Even wire electrodes of the same type but from different supplies, in which it would naturally be assumed that the modulus of elasticity, etc., would likewise be the same, have perceptibly different materials characteristics. Thus, experimental investigations have shown that the bending resistance of two similar wire electrodes, for example, can vary by 20% or more. (The modulus of elasticity (E) is, to a large degree, responsible for this dispersion). Finally, the angle of contact ($\gamma_0$), which is machine-specific and constant in and of itself, also changes, because of the wear on the current guiding means (4) and the manufacturing tolerance, upon the mounting of the wire guiding heads (2). The wear on the current guiding means (4), for example, leads to a displacement of the bearing point of the wire electrode (8) on the current guiding means (4) by up to 1 mm. The computation of the offset is, because of the materials parameters stored in memory, also only an approximation.

Figure 2A:
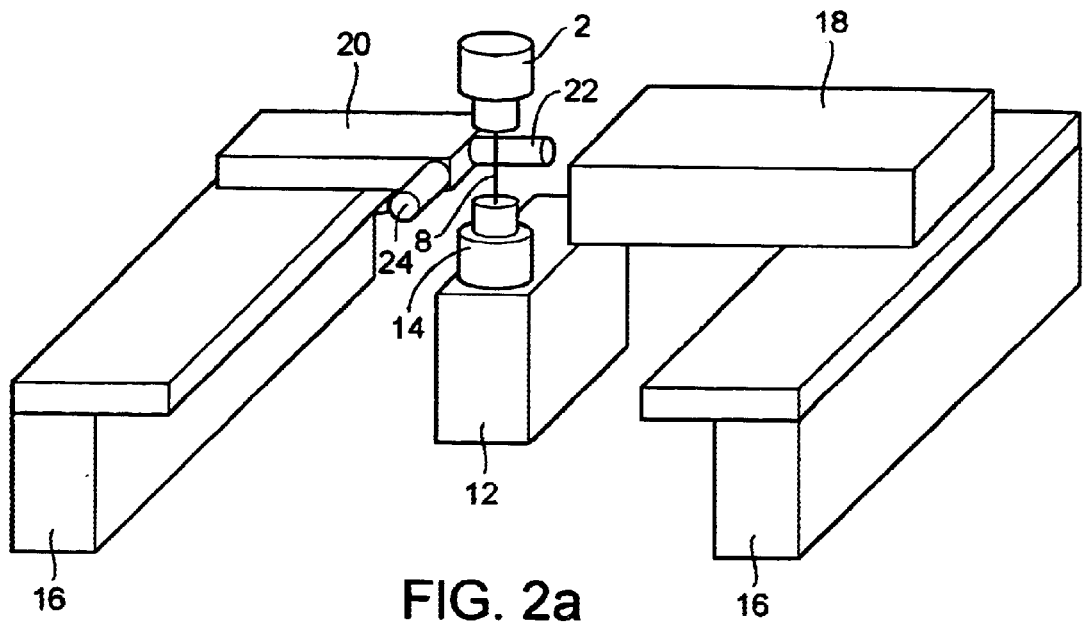
FIGS. 2-a, b depict two schematic perspective views of a working space, a wire electrode clamped between two wire guiding heads, and a centering point, with and without a clamping system for centering the wire electrode.
Figure 2B:
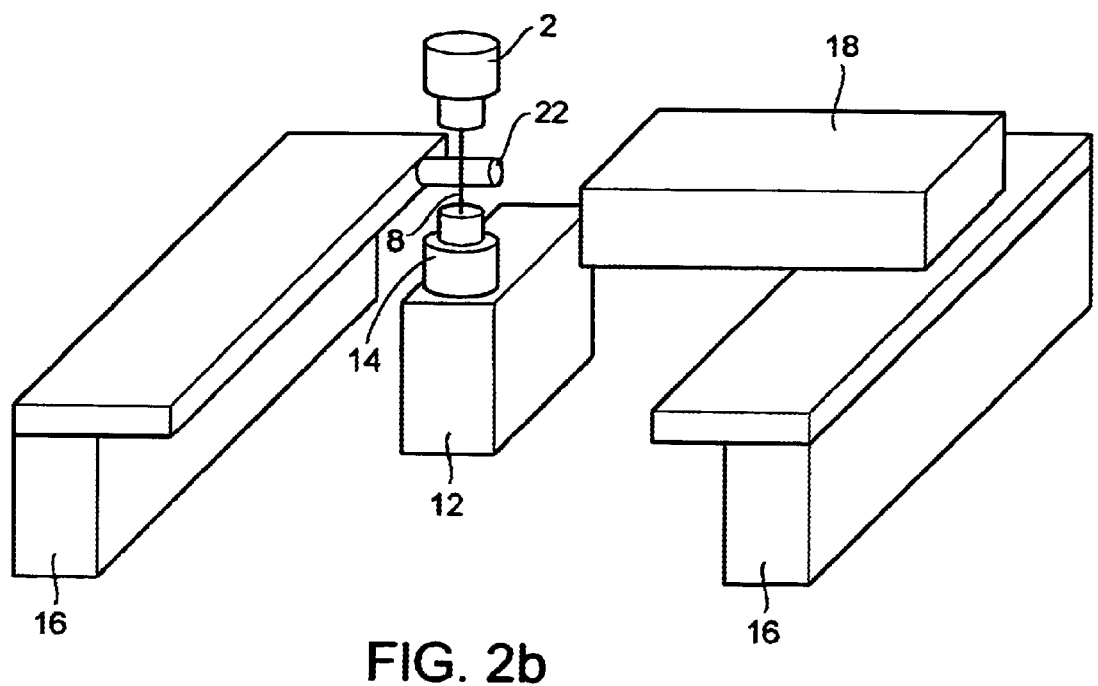

For the further increase of the precision of manufacturing, the offset of various wire electrodes (8) is measured. This can be carried out within the framework of several centering cycles, in which the position of a middle point of the wire electrodes (8) involved in a multiple wire processing is each determined upon the passing of a common centering point in the working space. One such centering cycle will now be illustrated in greater detail by means of FIGS. 2-a and -b. FIG. 2-a depicts the upper wire guiding head (2), and a lower wire guiding head (14) supported by a lower wire guiding arm (12). The wire electrode (8) proceeds between these wire guiding heads (2 and 14). FIG. 2-a also shows a work platform (16) in the form of a framework, a work piece (18) clamped on the work platform (16), as well as a centering point, clamped to the work platform by means of a clamping device (20), in the form of two cylindrical centering rods (22 and 24) which are oriented perpendicularly to one another, such as in the direction of the two primary axes (X and Y) of the wire eroding machine, for example. FIG. 2-b depicts a slightly altered situation, in which the centering point is applied, in the form of a single cylindrical rod (22), directly to the work platform (16).

The detection of the wire electrode (8) on the centering point can be carried out by means of electrical scanning, for example. This process is already used in connection with the known wire orienting cycles. For this, reference is made to the state of the art. Optical detection means, such as a laser measuring cell, such as those frequently used for the measuring of milling tools, for example, are an alternative to electrical scanning. A miniaturized measuring cell could even be integrated into the wire guiding head (2), such as slightly below the wire guide (6), for example. One such measuring cell on an optical basis is described in DE 28 26 270 and EP 0 312 056, the contents of which are hereby completely incorporated into the present application by reference.

The cause of the curvature of the wire electrode (8) and the displacement ($\delta_o$) thereby accompanying it is, thus, the course of the wire within the wire guiding heads (2 and 14) in front of the wire guide (6) (stated more precisely, in the upper wire guiding head (2) in the wire feeding device, upstream from the wire guide (6) and, in the lower wire guiding head (14), in the direction of feed of the wire downstream from the wire guide). This course of the wire is provided through the positioning of a last guide element in front of the specific wire guide (6). This guide element ensures that the wire electrode (8) is always applied to the wire guide (6). In the example depicted in FIG. 1-a, the guide element is the current guide unit (4). Alternatively, however, any other auxiliary guide can be used.

Usually, the position of the wire electrode (8) in relation to the centering point only needs to be measured in one of the axial directions. The other direction can generally be ignored. In order to secure the angle of contact ($\gamma_0$), the guide element (4) and the wire guide (6) are positioned offset relative to one another in a given direction. The displacement ($\delta_o$) is now preferably measured in this direction only (with the current guiding means [4] as the guide element, for example, this direction is the direction of its normal surface). For this, for example, only the centering rod (22) has to be moved forward. In order to measure the middle point of the wire electrode (8) in this direction, the wire electrode (8), for example, is moved forward from the front to the centering rod (22) up to the contact, the corresponding position of the wire guiding heads (2 and 14) in this direction is determined, and the wire electrode (8) is then moved from behind and onto the centering rod (22) up to the contact, the corresponding position of the wire guiding heads (2 and 14) is determined, and the middle point of the wire electrode (8) or of the middle point of the centering rod (22) is determined from that. This process is also carried out with respect to the remaining wire electrodes in precisely this way. The offset between two wire electrodes (8) is, finally, derived from the differences of the middle points specifically determined.

The centering cycle thereby preferably takes place with a specific reference wire traction force ($F_{Ref}$). In this, approximately that wire traction force which is actually required for the pending multiple wire processing is applied. Several centering cycles with different reference wire traction forces can also be carried out over the area of application of the specific wire electrode, however. The results for the individual wire electrodes can be sorted out in accordance with their designation, along with additional parameters relevant for the above computation, such as, among others, the wire diameter, the wire material, the modulus of elasticity, and the residual length of the wire on the supply spool, which are stored in memory upon measuring the reference wire traction force ($F_{Ref}$) that is used in the measurement (see the table of FIG. 3, in which, instead of the offset of the wire electrodes (8) in relation to a reference wire electrode (8), the measured middle point of the wire for each wire electrode (8) is listed, in relation to the centering point, under the column "reference position").

For this purpose, the control preferably has an expandable table with wire electrodes (8) which can be used on this wire eroding machine, or any type of commercially available wire electrodes (8) which the user can additionally expand at will by applying additional wire electrodes (8), or by providing additional information about the chemical composition and the electrical and mechanical materials characteristic values of the wire electrodes (8), particularly the tensile strength and, possibly, by providing further indications about the specific characteristics. It can thereby be stated in the table which wires are actually centered with one another. It is additionally stated, in the table of FIG. 3, under the column "Centered with," for example, that the wire electrodes with the numbers 05, 06 and 09 are linked with one another.

The centering cycles for the individual wire electrodes (8) can be optimized in such a manner that, on the one hand, the measuring uncertainty is minimized and, on the other hand, the total measuring time is not too long. For example, the centering cycles can be combined with other functions which must be carried out precisely during the set-up, such as the orienting of the wire or the scanning of the reference points, for example. By that means, the expense for the preparation of the multiple wire processing is increased to only a slight extent. The centering cycles are, in an advantageous manner, automated as much as possible. For the remaining steps (for example, such as the placing of the clamping system (20), etc.) that are to be carried out manually, the control (MMI/GUI) can be configured in such a manner that it supports the user for this by issuing corresponding reports and by preparing interaction possibilities by way of dialogue windows.

The measuring of the offset over a centering cycle is more expensive and takes more time than its computation in accordance with the above formulas since, as a rule, a dialogue with the user, the automatic threading of the wire electrode, the movement to the centering point, and the determining and the storage in memory of the middle point of the wire are generally necessary, with this being for every individual wire electrode. Through the measuring of the offset, however, the stated dispersions of the materials parameters of the wire electrodes (8), the current abraded condition of the current guiding means, and additional variables which cannot be determined by computational means, are also taken into consideration. This additional expense is tolerated with particular precision requirements.

In addition, the computational approximation of the offset and the measurement of the offset can also be combined in order to carry out a plausibility test for the offset measured, for example. If the computed value and the measured value differ from one another by more than 20 μm, for example, then a new measurement must be started.

The measurement of the relative positions of the wire electrodes (8) which are involved in a linked multiple wire processing should be carried out before any operation of work piece processing which is relevant to precision—that is to say, for example, even before the approaching of the reference points, which always takes place, during the overall processing, before the actual eroding operation. Thus, the position of the clamped work piece can, for example, be determined with the wire electrode (8) just clamped by scanning the work piece, whereby the work piece is subsequently processed with another wire electrode (8). It is also necessary for this that the offset of both of these wire electrodes (8) relative to one another be known in advance.

The CNC control of the wire eroding machine is, in addition, designed in such a manner that, for multiple wire processings, it gives the user the possibility of connecting those processing objects which are to be processed with different wire electrodes (8) to one another. That is to say, for the purpose of simplifying the programming, the processing can be defined within the framework of an object-oriented data structure; for example, in objects, such as processing, processing groups, geometry, rough-work, finishing, fine-finishing, etc. With this object structure, a connection can be produced in a way that is extremely simple and can be monitored well. Upon linking, the user determines that these processing objects have a geometrical relation to one another—that is to say, the offset of the different wire electrodes (8) to be used there must be taken into consideration. The individual processing objects are, for this purpose, linked directly with one another, such as the object "Processing A" with the object "Processing B", for example, in which the offset of the corresponding wire electrodes (8) after their change is relevant. Thus, during a multiple wire processing, it is not absolutely all of the wire electrodes (8) which carry out a processing which require a geometrical relation to the contours thereby processed. One typical example of application in which the geometrical relation is relevant, however, is a matrix of a follow-up compound tool which is cut, over the course of several processings, with different wire electrodes (8). In this case, the wire offset of the wire electrodes (8) used is important for the precision of the individual cutting contours. Upon inputting the geometries to be cut, the user also determines which cutting contours are to be combined with one another in order to increase the precision of the processing. Before the start of the processing, the CNC control monitors whether a common valid centering cycle has already been carried out for the cutting contours that are linked with one another and, in the event of a contrary result, issues a corresponding report.

One possible dialogue of the control with the user during the set-up can thereby appear as follows: The user begins with the selection "Processing set-up." Then, he selects the processing to be carried out and decides, by way of a corresponding dialogue window, whether he would, within the framework of a linked multiple wire processing, like to work in a particularly precise manner, which presupposes the carrying out of a centering process, or not, for which alternative a computation of the theoretical offset of the wire electrode (8) involved is sufficient.

The list of types of wire stored is thereupon listed in a dialogue window and the user is called upon to designate those wire electrodes (8) which should carry out the common centering process. The control investigates whether the designated wire electrodes (8) have already carried out a valid common centering process, or whether a portion of the wire electrodes involved are already centered to one another. If this is affirmed by the control, then a corresponding report to the user is carried out. The user can then either take over or reset the old centering process, or else replace it with a new centering process. If the control determines that the designated wire electrodes have still not carried out any valid common centering cycle, then this is initiated immediately. Alternately to the direct inputting of the processing objects to be combined, the user can also simply connect the involved wire electrodes (8) with one another, whereby the control automatically compensates the wire offset upon changing the wire. Simultaneously with the centering process initiated, the theoretical offset is also computed by means of the wire characteristic values stored in memory, and the wire traction force that is used is computed in order to check the plausibility of the centering process.

If a new centering process only needs to be carried out for a portion of the wire electrodes, then a dialogue window asks the user whether the measuring rod has been offset. If yes, then the measuring values of all earlier centering cycles are to be reset. Furthermore, the control asks the user, after removing a wire supply roller and replacing it with a new roll, whether the function "Center wires" should be carried out yet again for all wire electrodes that are linked with one another with the newly-exchanged wire electrode, or whether the data of an earlier centering cycle is still valid or not. The wire changing device is, advantageously, provided with wire detectors, so that the control thereby automatically initiates the above query.

The above-described processes and apparatus can, in addition, be combined with the follow-up cutting process in accordance with EP 0 578 018 B1, by the same applicant, in which the control independently recognizes whether the cutting path of the first wire electrode (primary cut) is in agreement with the second- and, if applicable, with the third wire electrode. If this is applicable, then the follow-up cuts can be carried out with reference to the contour produced by the primary cut, as is described in the patent cited. This thereby involves a special case, in which a centering process can be dispensed with, despite the multiple wire processings.

For this, it is input in the column "Centered with," as depicted in the table of FIG. 3, for example, that the wire electrodes with the numbers 05, 06, and 09 are linked with one another.

From the foregoing, persons of ordinary skill in the art will appreciate that, upon the electrical discharge processing of a work piece in which processing is carried out with at least two wire electrodes, the offset of the two positions of the at least two wire electrodes to one another (which positions the wire electrodes assume upon their clamping because of their angles of contact to a corresponding wire guide and their different wire characteristics), is accordingly determined at the level of the work piece. The positions of the wire electrodes after a change from one wire electrode to the next one are subsequently corrected on the basis of the offset determined between these wire electrodes. The offset between two clamped wire electrodes is determined, and this offset is subsequently referred to for the correction of the positions (such as the path of the guiding heads, for example) after the change of the electrode. This has the advantage that, in principle, all factors that have an influence on the actual course of the wire electrode between the upper- and the lower wire guide are eliminated through the fact that only one value is determined for the offset, and this is referred to for the correction of position after the change of the electrode.

Although certain apparatus and methods have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A process for processing a work piece by electrical discharge with at least two wire electrodes, the process comprising:

determining a relative offset between the at least two wire electrodes at a level of the work piece when the wire electrodes are clamped for machining, the relative offset being caused by (1) respective angles of contact between each of the at least two wire electrodes and a wire guide, and (2) different wire characteristics of the at least two wires; and correcting a position of at least one of the at least two wire electrodes after changing from one of the at least two wire electrodes to another of the at least two wire electrodes on the basis of the relative offset.

2. A process as defined in claim 1, wherein the relative offset is computed.

3. A process as defined in claim 1, wherein the relative offset is computed based on a wire diameter of at least one of the wire electrodes, a modulus of elasticity of the at least one of the wire electrodes, a traction force operating on the at least one of the wire electrodes, and the angle of contact of the at least one of the wire electrodes on the wire guide.

4. A process as defined in claim 3, wherein the relative offset is computed with the following formulas:

$$\delta_o = \frac{\gamma_o}{2}\sqrt{\frac{E \cdot l}{F}} \text{ in which: } l = \frac{d^4 \cdot \pi}{64}$$

wherein ($\gamma_0$) is the angle of contact of the at least one wire electrode on the wire guide, (E) is the modulus of elasticity of the at least one wire electrode, (l) is an axial surface moment of the at least one wire electrode, (F) is the traction force operating on the at least one wire electrode, and (d) is the diameter of the at least one wire electrode.

5. A process as defined in claim 1, wherein the relative offset is measured.

6. A process as defined in claim 5, wherein measuring the relative offset comprises:

a) measuring a first position of a first clamped one of the wire electrodes in a working space relative to a point of reference;

b) measuring a second position of a second clamped one of the working electrodes in the work space relative to the point of reference;

c) determining the relative offset by computing a difference between the first and the second positions, and d) repeating (a) to (c) for any additional ones of the wire electrodes that are to be used in the machining process.

7. A process as defined in claim 6, wherein a common centering point is used as the point of reference.

8. A process as defined in claim 6, wherein the first and second positions are measured with an optical measuring cell integrated into the wire guiding head.

9. A process as defined in claim 5, wherein the relative offset of the wire electrodes is measured at a constant traction force operating on the wire electrodes.

10. A process as defined in claim 5, wherein several sets of possible relative offsets of the wire electrodes are measured for different traction forces operating on the wire electrode.

11. A process as defined in claim 5, wherein the relative offset of the wire electrodes is measured exclusively in a perpendicular to a contact surface of the wire electrode on a current guide element.

12. A process as defined in claim 5, wherein a plausibility check for a measured value of the relative offset is carried out for the relative offset on the basis of a computed value.

13. A process as defined in claim 1, wherein the processing of the workpiece is subdivided into individual processing objects, and the user can select which of the individual processing objects are linked with one another, wherein linking processing objects indicates that the relative offset of the wire electrodes involved in the linked processing objects are to be corrected.

14. A process as defined in claim 5, wherein measured values of the relative offsets are stored in a table with additional wire parameters.

15. A process as defined in claim 14, wherein the user can select which of the wire electrodes stored within the table are to be combined for the processing of the workpiece, whereby a combination of wire electrodes indicates that the relative offset of the combined wire electrodes are to be corrected.

16. A process as defined in claim 13, further comprising automatically checking, upon set-up, whether positions of linked wire electrodes relative to one another have previously been measured.

17. An electrical erosion machine for multiple wire processing comprising:

a guide head to guide a processing electrode;

a control device to control a path of the guide head, wherein the control device determines a relative offset between positions of at least two wire electrodes which the wire electrodes occupy at the level of the workpiece upon clamping because of (1) respective angles of contact of the respective wire electrodes on a wire guide, and (2) different wire characteristics of the wire electrodes, and wherein, during the processing of the work piece, the control device corrects the path of the guide head after a change from one of the wire electrodes to another one of the wire electrodes based on the relative offset determined between the wire electrodes.

* * * * *